Patented Oct. 26, 1954

2,692,894

UNITED STATES PATENT OFFICE 2,692,894

β-DIETHYLAMINOETHYL 4-PHENYL-BENZOATE BITARTRATE

Melville Sahyun, St. Johns, Mich.

No Drawing. Application January 8, 1951,
Serial No. 205,039

1 Claim. (Cl. 260—469)

This invention relates to local anesthetics, and is particularly concerned with the bitartrate acid-addition salt of β-diethylaminoethyl 4-phenylbenzoate, having the formula:

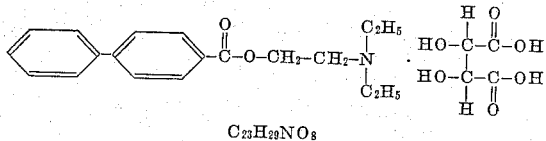

$C_{23}H_{29}NO_8$

An object of the present invention is to provide a compound having local anesthetic properties and only slight local irritative effects. A still further object of the present invention is to provide the bitartrate salt of β-diethylaminoethyl 4-phenylbenzoate and a method for producing the same.

Certain fundamental qualities must be possessed by a compound before it can be properly classified as a local anesthetic. It must be capable of blocking nerve conduction when applied locally to nerve tissue in effective concentrations. The systemic toxicity and concentration necessary to produce activity must be such that the ratio of activity to toxicity makes the compound capable of use. In addition, local irritative effects resulting from local applications must be kept at a minimum. The outstanding practical value of local anesthetics results from their reversibility of action so that complete recovery of nerve function without damage to nerve fibers or cells is accomplished. Virtually all of the commonly used local anesthetics today fail to meet one or more of these fundamental requisites. For example, cocaine is very active, yet its use frequently results in addiction and in toxic damage to nerve fibers and cells. Ethyl aminobenzoate shows less toxicity then cocaine but contains a weakly basic nitrogen atom and so cannot be used for injection purposes, so that its application is restricted to surface and topical use. Procaine has displaced cocaine generally where an injection type local anesthetic is required, and is only mildly addictive. However, procaine is not satisfactory for surface application, particularly for those applications involving the eye, ear, nose and throat. More recently, dibucaine (α-butyl-oxycinchoninic acid-γ-diethylenediamide hydrochloride) has been developed and is perhaps the most active of all local anesthetics synthesized to date, but, however, its toxicity likewise is very great, so that the overall therapeutic index, as shown by the ratio of activity to toxicity, is not outstanding.

I have now found that the bitartrate salt of β-diethylaminoethyl 4-phenylbenzoate can be synthesized by means of a relatively simple reaction. In its essential form, my method involves the reaction of the free β-diethylaminoethyl 4-phenylbenzoate ester base with tartaric acid in isopropanol solution. I have also found that the β-diethylaminoethyl 4-phenylbenzoate bitartrate possesses excellent local anesthetic properties and, further, shows virtually no local irritative effects in comparison with, for example, the hydrochloride addition salt.

The free basic ester, β-diethylaminoethyl 4-phenylbenzoate, can be prepared by reacting para-xenyl formic acid (4-phenylbenzoic acid) with β-diethylaminoethyl chloride. The preferred method involves the reaction of the para-xenyl formic acid with β-diethylaminoethyl chloride in the presence of isopropanol by refluxing the mixture for about two hours or longer at 80-85 degrees centigrade. After completion of the reaction, the hydrochloride of the basic ester is separated from the isopropanol and other reaction products by cooling the mixture and filtering the solution, leaving the crude hydrochloride salt on the filter. The free basic ester is recovered by dissolving the crude hydrochloride salt in water and extracting the solution with ether to remove any remaining isopropanol or other hydrophobic organic substances. The aqueous hydrochloride salt mixture is neutralized with sodium hydroxide, extracted with ether or other suitable organic liquid, and the extract distilled to remove the solvent. The basic ester, β-diethylaminoethyl 4-phenylbenzoate, is then distilled under reduced pressure to complete the purification process. The free basic ester is obtained as a liquid boiling at 160-164 degrees centigrade under a pressure of 0.01 millimeter of mercury absolute, and is soluble in nearly all organic solvents, but insoluble in water.

The following example is given by way of illustration but is in no way to be construed as limiting.

Example 1

One mole of dextro-tartaric acid dissolved in isopropanol was reacted with one mole of β-diethylaminoethyl 4-phenylbenzoate on a heated water bath for five hours. The mixture was then distilled to remove the isopropanol and the residue, β-diethylaminoethyl 4-phenylbenzoate bitartrate, was recrystallized from a mixture of ethanol and ether. The bitartrate salt was obtained as a white, non-hygroscopic powder, melting at 72–74 degrees centigrade and having a molecular weight of about 447. The nitrogen content was calculated as 3.13 percent and experimentally determined as 3.11 percent. The bitartrate salt was soluble in water to the extent of two percent by weight, soluble in alcohols, but insoluble in ethers.

In the manner of Example 1, other solvents, such as alcohol or a mixture of alcohol and ethyl acetate, may be employed to dissolve the tartaric acid prior to reacting it with β-diethylaminoethyl 4-phenylbenzoate.

My novel bitartrate salt of β-diethylaminoethyl 4-phenylbenzoate has been demonstrated to show excellent pharmacological properties as a local anesthetic. It has been shown to be effective in blocking nerve conduction when applied locally to nerve tissues, in relatively low concentrations. It produces anesthesia rapidly and without causing serious damage to nerve structures. The local anesthetic activity is prolonged, yet the action is reversible so that complete recovery of the nerve function results. In addition, the systemic toxicity is low and to date, no evidence of addiction has been reported. Furthermore, it has a high therapeutic index.

Clinical and laboratory comparisons with other local anesthetics, such as cocaine and procaine, have established the existence of favorable local anesthetic properties in the bitartrate salt. For example, corneal anesthesia was measured in rabbits' eyes by mechanical stimulation after instillation of solutions of varying composition into the conjunctival sac, followed by firm closure of the eye for thirty seconds to insure contact of the solution with the entire cornea. The threshold anesthetic concentration, the concentration at which anesthesia is first apparent, was shown to be between 0.1 and 0.2 percent. On the same basic of testing, procaine exhibits a threshold anesthetic concentration of 4.0 percent, or approximately 13 times the concentration of β-diethylaminoethyl 4-phenylbenzoate bitartrate required to initiate local anesthetic activity. Likewise, cocaine shows a threshold anesthetic concentration of 0.3 percent, considerably higher than the 0.1–0.2 percent clinically established for the bitartrate salt. A 0.3 percent concentarted solution of the bitartrate salt produced local anesthesia for at least three minutes, a 0.5 percent concentration for ten minutes, a 1.0 percent solution for 13.5 minutes and a 5.0 percent solution for 35 minutes. Even at 5.0 percent concentration of the bitartrate salt, a concentration considerably higher than that used in the normal commercial preparation, no evidence of severe local irritative effects was obtained. In addition to possessing a lower threshold anesthetic concentration value than procaine, the β-diethylaminoethyl 4-phenylbenzoate bitartrate shows greater prolongation of activity at comparable concentrations. For example, the 1.0 percent solution of the bitartrate salt produces complete local anesthesia for 13.5 minutes, whereas a 1.0 percent solution of procaine produced complete local anesthesia for a period of only two minutes.

The local irritative effects of β-diethylaminoethyl 4-phenylbenzoate bitartrate on rats have been carefully investigated. The urine was completely expressed from the urinary bladder of rats lightly anesthetized with ether to permit delivery of the bladder through an abdominal incision, and the bitartrate salt in concentrations of 0.1, 1, 2, and 5 percent was injected in 1–2 cc. amounts into the bladder. Vascular changes were then observed for a few minutes through the distended transparent bladder wall, and the bladder was subsequently replaced and the abdomen closed. Fourteen hours later the rats were killed and the mucosa tissues of the bladder were carefully examined. In no instances was there any immediate or late hyperemia of the bladder, or other evidence of irritant effects, all observations being compared with urinary bladders treated with saline controls. No systemic symptoms attributable to the bitartrate salt occurred and no evidence of inflammatory reaction resulted.

The toxicity of β-diethylaminoethyl 4-phenylbenzoate bitartrate to fibroblasts and nerve fiber growths in vitro has been determined by culturing tissue fragments from 6-day-old chick embryos in media containing varying concentrations of the bitartrate salt. The tissue fragments were cultured 48 hours and the outgrowth of cells from the tissue explants was then observed. At a concentration of fifty milligram percent, considerable growth of fibroblasts from the tissue fragments resulted and was accompanied by only moderate injury, while the 12.5 milligram percent concentration permitted the growth of fibroblasts to continue at a much greater rate, with only slight injury resulting. At 25 milligram percent concentration the outgrowth of nerve fibers was only slightly inhibited, and the growth at 12.5 milligram percent concentration was fully equal to that of the controls. Such results indicate that the toxicity of the bitartrate salt to fibroblasts and nerve fibers is less than that of other local anesthetics. For example, the bitartrate salt is shown to be appreciably less toxic than dibucaine and cocaine hydrochloride on the basis of these tests.

Further significance of these clinical data is reflected by the therapeutic index of the β-diethylaminoethyl 4-phenylbenzoate bitartrate. For example, low values reported for toxicity, in comparison with values obtained with other local anesthetics, result in a high value for the $$\frac{\text{activity}}{\text{toxicity}}$$

ratio, or therapeutic index. Thus, the requirement of a high therapeutic index for a local anesthetic is satisfactorily fulfilled by the bitartrate salt.

Reference is made to my earlier application Serial 112,835 filed August 27, 1949, now abandoned.

Various modifications may be made in the present invention without departing from the spirit or scope thereof, and it is to be understood that I limit myself only as defined in the appended claim.

I claim:
β-diethylaminoethyl 4-phenylbenzoate bitartrate.

References Cited in the file of this patent

UNITED STATES PATENTS

| Number | Name | Date |
|---|---|---|
| 2,410,040 | Blicke | Oct. 29, 1946 |
| 2,421,129 | Reasenberg et al. | May 27, 1947 |
| 2,516,098 | Bambas | July 25, 1950 |

OTHER REFERENCES

Bell, J. Chem. Soc. (London) 1928, pages 3247–9.